A. C. BUSSEY.
EGG BOX.
APPLICATION FILED FEB. 17, 1913. RENEWED JULY 6, 1916.

1,216,208.

Patented Feb. 13, 1917.
3 SHEETS—SHEET 1.

WITNESSES

INVENTOR
ALLAN C. BUSSEY
BY
ATTORNEYS

A. C. BUSSEY.
EGG BOX.
APPLICATION FILED FEB. 17, 1913. RENEWED JULY 6, 1916.

1,216,208.

Patented Feb. 13, 1917.
3 SHEETS—SHEET 2.

WITNESSES

INVENTOR
ALLAN C. BUSSEY
BY
ATTORNEYS

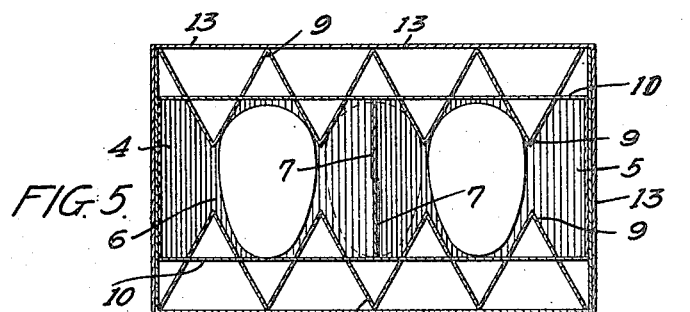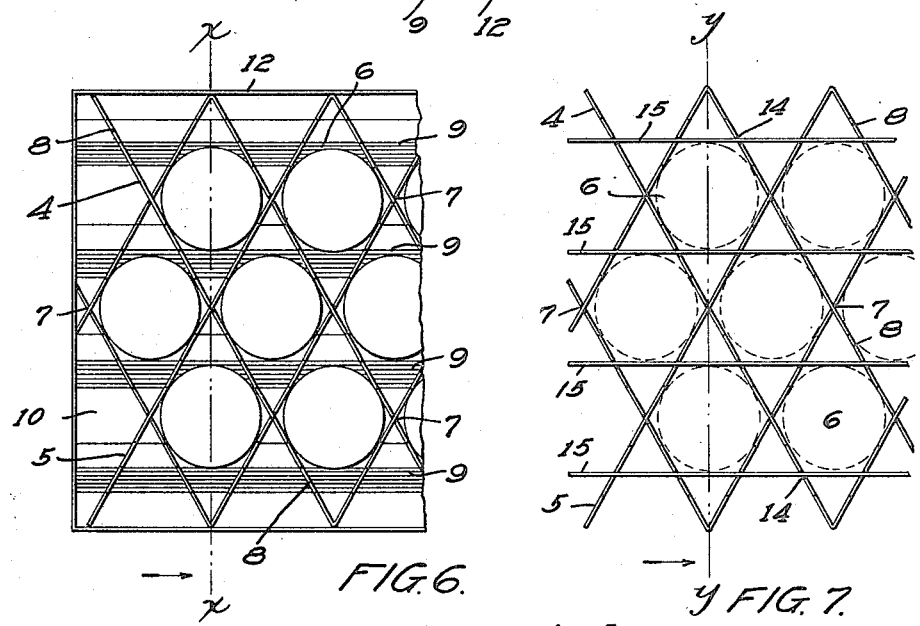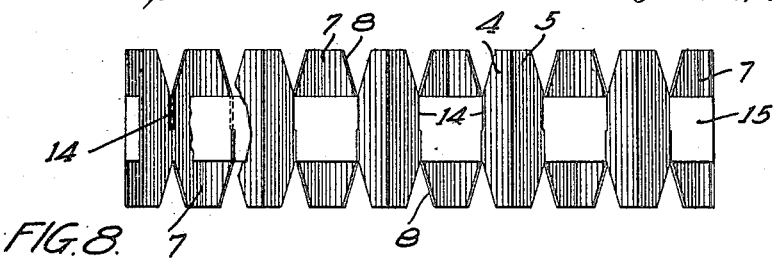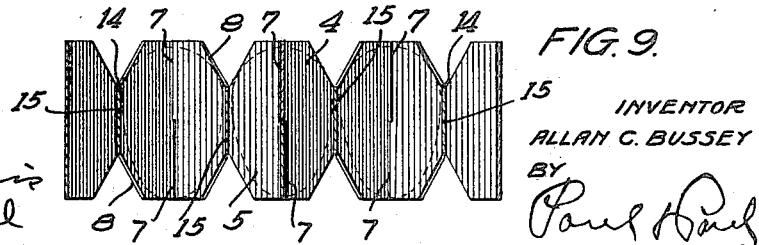

UNITED STATES PATENT OFFICE.

ALLAN C. BUSSEY, OF MINNEAPOLIS, MINNESOTA.

EGG-BOX.

1,216,208. Specification of Letters Patent. Patented Feb. 13, 1917.

Application filed February 17, 1913, Serial No. 748,897. Renewed July 6, 1916. Serial No. 107,873.

*To all whom it may concern:*

Be it known that I, ALLAN C. BUSSEY, a citizen of the United States, resident of Minneapolis, Hennepin county, Minnesota, have invented certain new and useful Improvements in Egg-Boxes, of which the following is a specification.

My invention relates to egg boxes or cases and particularly to those used for shipping eggs from place to place, and the object of the invention is to provide a box or receptacle in which the eggs will be so arranged that they will not come in contact with the outside wall of the package, nor will the shock or jar arising from a blow or the dropping of the case be transmitted from one egg to another through the case, as usually happens in egg boxes as generally constructed.

Other objects of the invention will appear from the following detailed description.

The invention consists generally in various constructions and combinations, all as hereinafter described and particularly pointed out in the claims.

Figure 1:
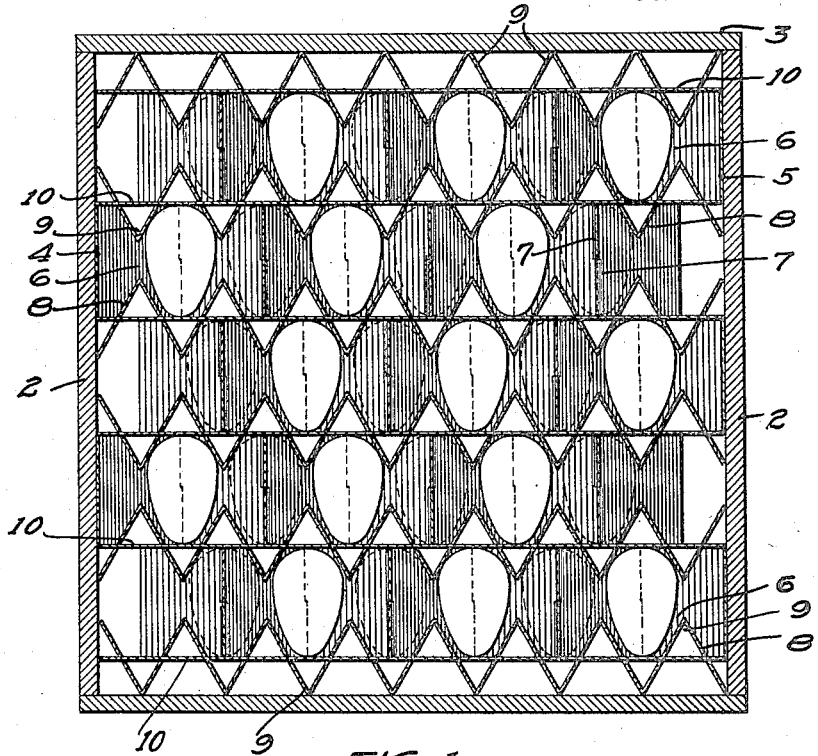
Figure 2:
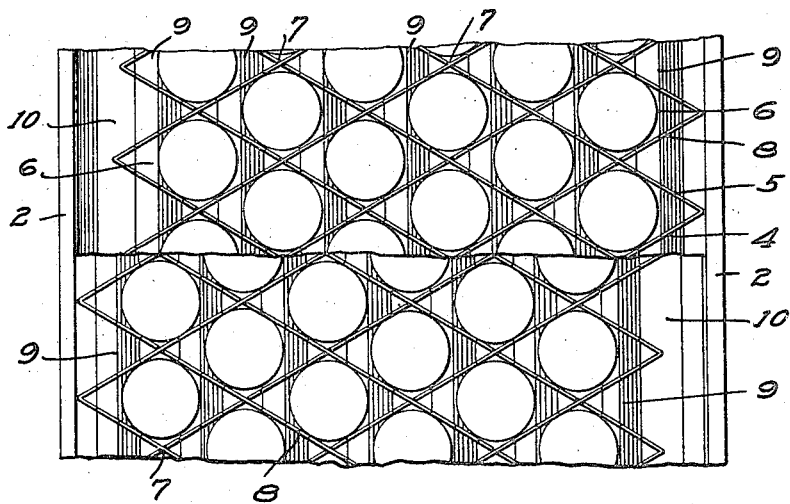
Figure 3:
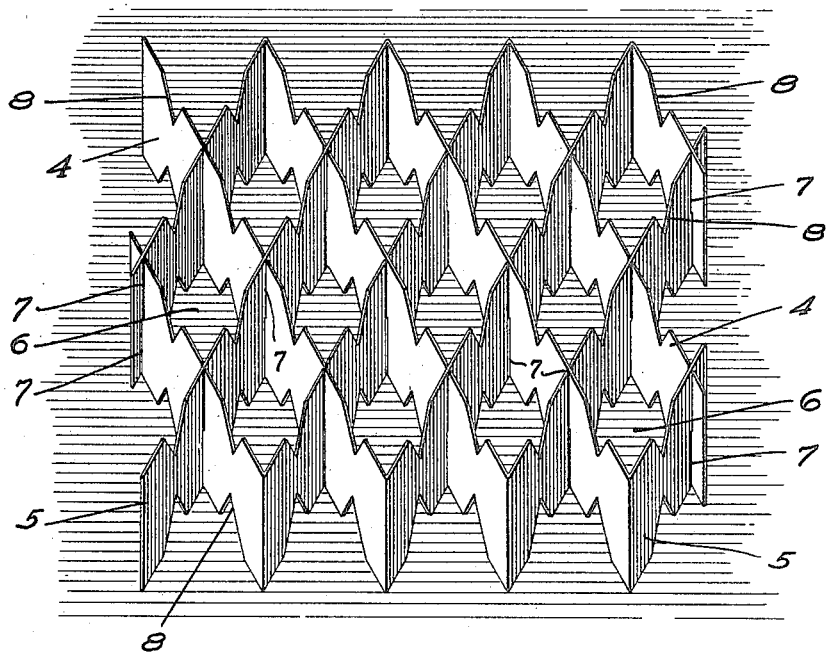
Figure 4:
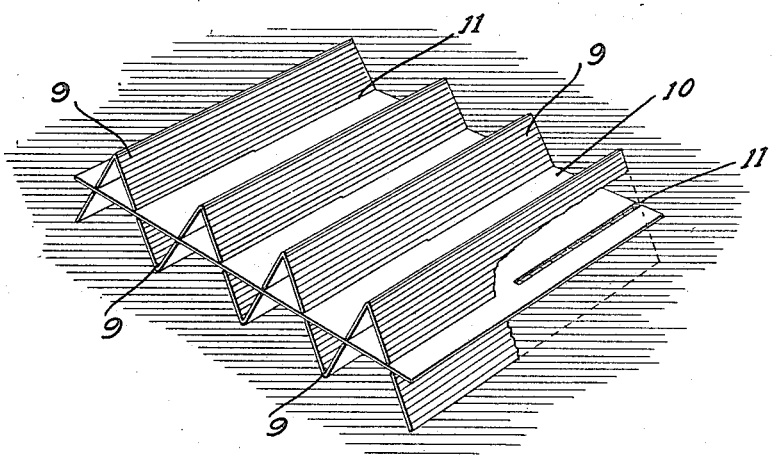

In the accompanying drawings forming part of this specification,

Figure 1 is a vertical sectional view through an egg case embodying my invention, Fig. 2 is a plan view, looking down on the egg filler and the eggs therein, the filler being partially broken away to show the position of the eggs in the filler next beneath, Fig. 3 is a perspective view, illustrating the filler removed from the case and showing the preferred means for interlocking the plates of which the filler is composed, Fig. 4 is a perspective view, showing the preferred construction of the corrugated plate which separates the fillers, Fig. 5 is a sectional view on line $x$—$x$ of Fig. 6, showing the invention applied to a small mailing case containing one layer of eggs, Fig. 6 is a plan view of the same, Fig. 7 illustrates a modified construction which I may employ for converting the egg pockets from a diamond shape to a hexagonal shape, Fig. 8 is a side view of the filler illustrated in Fig. 7, showing the preferred means for inserting the plates to complete the hexagon into the filler, Fig. 9 is a detail sectional view on the line $y$—$y$ of Fig. 7, illustrating the preferred manner of slitting the filler plate to receive the hexagon forming plates.

In the drawing, 2 represents a case, preferably of wood, having a suitable cover 3. This case may be made of any suitable dimensions and may correspond substantially to the ordinary wooden egg case in general use. The filler which I prefer to provide for this case comprises a series of plates 4 arranged parallel with one another and spaced apart, and a corresponding number of similar plates 5, also arranged parallel with one another and interlocking with the plates 4 to form a series of diamond-shaped egg pockets 6. The interlocking of these plates may be effected in any suitable way, preferably by providing transverse slits 7 therein extending partially through the plates, each slit being adapted to receive the longitudinal edge of the intersecting plate to lock the plates together at the angles of the pockets. Evidently, the plates may be swung on their interlocking portions and folded so that the plates will lie flatwise upon one another in a compact form, or may be expanded or separated to form pockets for the insertion of the eggs.

The plates 4 may be formed independently of the plates 5, but preferably the plates 5 are continuations of the plates 4, narrow strips of flexible material being used and bent transversely at suitable intervals, according to the desired size of the case. The walls of the egg pockets at the top and bottom are provided with centrally arranged, V-shaped notches or recesses 8 that are adapted to receive the corrugations 9 of a plate 10 which separates one layer of the egg pockets from the adjacent layer. The corrugations may be formed in any suitable manner, but preferably by providing transverse slits 11 in the plate 10 at suitable intervals, and similar slits in the plate comprising the corrugations 9, the plate and corrugations being moved edgewise to interlock them one with another. The slits in the plate 10 are made at suitable intervals and the plate comprising the corrugations is creased and folded transversely and interlocked with the plate 10 so that a series of ribs, triangular in cross section, or corrugations, as I prefer to designate them, are formed on opposite sides of the plate 10, the corrugations alternating in position with one another from end to end of said plate. These corrugations may, of course, be formed by gluing or otherwise securing strips of folded material on opposite sides of the plate. This construction, however, would be obvious and illustration is unnecessary. I prefer, however, for economy of manufacture, to construct the plate and corrugations in the manner shown.

The notches in the plates 4 and 5 are of sufficient depth to receive the corrugations, and as shown plainly in Fig. 1 of the drawings, the walls of the corrugations will extend down on each side of the upper end of the egg inserted in the pocket and the corrugations of the plate beneath the egg and on which the egg rests will extend up upon opposite sides of the lower end of the egg and thus the egg will be supported in an upright position, as shown, and be held by the yielding walls of the corrugations against tipping or falling over sidewise in the pocket. The alternate arrangement of the corrugations or ribs of the plate 10 causes the eggs of adjoining layers to be offset or staggered with respect to one another, as shown in Fig. 1, where the pockets of the lower row or layer are in staggered relation to those of the next layer above, and the eggs will be in corresponding relation to one another. It thus happens that instead of one egg of a layer being directly opposite an egg of the adjacent layer and separated only by the thickness of a plate with which both eggs contact, the egg of one pocket will be separated a considerable distance from the corresponding egg of the pocket in the adjacent layer, and the intersecting portions of the plates and corrugations will lie between the adjacent eggs of the adjoining layers and will form a cushion therefor and take up the shock or jar resulting from the dropping of the case.

In preparing to fill the case, a plate with the corrugations thereon is placed in the bottom of the case and the plates forming the series of egg pockets are laid upon the upper corrugations, which enter the recesses in the lower edges of the plates. The eggs are then placed in the pockets and the operation repeated until the case is full.

As shown plainly in Fig. 1, the egg pockets of one series, due to the alternate arrangement of the corrugations above and below the plates, will be offset or staggered with respect to the pockets of the adjacent series, and the plates forming one series of pockets will contact with the side wall of the case on one side, while the plates of the other series next above will contact with the other side wall and alternate back and forth from the bottom to the top of the case. The vertical rows of eggs will therefore be spaced a considerable distance from the side walls of the case and cannot possibly be broken by any blow on the outside of the case. Furthermore, as shown plainly in Fig. 1, the corrugations on the bottom of the lower plate will elevate this plate a considerable distance above the bottom and the upper corrugations of the top plate will space the upper pockets a corresponding distance from the cover. The upper and lower horizontal rows of eggs will thus be separated from the top and bottom of the case and the corrugations will form yielding supports or bearings for these rows, so that any sudden jar or shock on the top or bottom of the case will not be transmitted through the walls thereof and break the eggs.

In Fig. 5 a case 12 is shown, telescoping with a cover 13 and provided with a filler for receiving a single layer of eggs, with the corrugated plates above and below them and the eggs spaced from the walls of the case and from each other in substantially the same manner as described with reference to sheets 1 and 2 of the drawings. This case is particularly adapted for mailing purposes and for sending hatching eggs from place to place.

In Fig. 7 I have shown a modified construction which consists in providing vertical slits 14 in the plates forming the walls of the pockets, adapted to receive division strips 15 having transverse slits therein to receive the plates forming the walls of the egg pockets. These division strips extend across the opposite corners of the pockets, as plainly shown in Fig. 7, and form another wall with which the egg contacts and converts the pocket from a diamond to a hexagonal shape. In other respects the construction is substantially the same as shown and described with reference to the preceding figures.

I claim as my invention:—

1. An egg filler comprising a series of parallel plates, a second series of parallel plates intersecting the plates of said first series to form egg pockets, said plates having notches in their upper and lower edges intermediate to the points of intersection of said parallel plates, and plates having corrugated surfaces between which said intersecting plates are arranged, the corrugations fitting within the recesses of said intersecting plates and forming lateral supports for the upper and lower ends of the eggs in said pockets.

2. An egg filler comprising a series of parallel plates, a second series of parallel plates intersecting said first named series and forming therewith a series of egg pockets, said plates having V-shaped recesses in their upper and lower edges midway, substantially, between the points of intersection of said plates, and plates adapted to bear flatwise on the upper and lower edges of said intersecting plates and having corrugations, V-shaped in cross section, to fit into the recesses of said intersecting plates and form converging walls on both sides of the eggs in said pockets, said corrugations bracing and supporting the walls of said pockets against lateral pressure.

3. An egg filler comprising a series of parallel plates, a second series of parallel plates intersecting said first named series and forming therewith a series of egg pockets, said plates having V-shaped recesses in their upper and lower edges intermediate to the points of intersection of said plates, a plate closing the bottoms of said pockets and having corrugations, V-shaped in cross section, thereon to enter the V-shaped recesses in said intersecting plates, a plate resting upon the top of said pockets and having similar V-shaped corrugations on its upper and under surfaces, the corrugations of its under surface fitting the recesses in the upper walls of said pockets, and a second set of intersecting plates resting upon said last named corrugated plate and having recesses in the lower walls of its pockets to receive the corrugations of the upper surface of said last named plate, the upper corrugations being offset or staggered with respect to the lower corrugations of the said last named plate, whereby the pockets of the lower series will be offset with respect to the pockets of the upper series, the corrugations of said last named plate forming a yielding wall between the eggs in said offset pockets.

4. An egg filler comprising a series of sections placed one upon another, each section being provided with a series of egg pockets, division plates interposed between said sections, said plates comprising a flat member having a series of transverse, parallel slits therein and a member creased and folded transversely and having a series of slits intermediate to said folds to receive the edge of said flat member and thereby form a series of corrugations alternating on the upper and under surfaces of said flat members, the walls of said pockets having recesses therein to receive said corrugations, said corrugations lapping by the ends of the eggs in said pockets and supporting them in an upright position, the alternate arrangement of said corrugations offsetting the pockets of adjoining sections from the top to the bottom of said filler.

5. An egg filler comprising a series of sections placed one upon another and each having a series of egg pockets therein, division plates interposed between said sections and each composed of a flat member and a second member creased and folded transversely and interlocking with said flat member to form a series of corrugations alternately arranged on the upper and under surfaces of said flat member, said corrugations projecting into the pockets of adjoining sections and adapted to lap by the ends of the eggs therein, the alternate arrangement of said corrugations offsetting the pockets of adjoining sections and the point of intersection of said folded member with said flat member being dispose between the offset pockets of adjoining sections.

6. The combination, with a case, of an egg filler arranged therein and comprising a series of sections placed one above another, each section having a series of egg pockets having recesses in their upper and lower walls, division plates composed of interlocking members having corrugations projecting from their upper and under surfaces and fitting within the recesses of said pockets, the upper corrugations alternating with the under corrugations, said sections being alternately spaced from and in contact with the side walls of said case from the top to the bottom of the filler, said division plates extending from side to side of said case and locking said sections against lateral movement, the alternate arrangement of said sections spacing the egg pockets therein from the side walls of said case.

7. The combination, with a case, of an egg filler fitting therein and comprising a series of sections placed one above another, each section having a series of egg pockets therein, a series of division plates interposed between said filler sections and having corrugations projecting from their upper and under surfaces and into the pockets of the sections between adjoining division plates and upon each side of the eggs in the pockets of said sections, the under surface corrugations of the lower division plate resting upon the bottom of said case and forming yielding supports for the filler sections above, and the upper surface corrugations of the upper filler plate contacting with the cover of the case and forming a yielding bearing thereon for the upper filler section.

8. The combination, with a case, of an egg filler fitting therein and comprising a series of sections placed one above another, the lower section of the series having a series of notches in the lower walls of its egg pockets, a division plate interposed between said lower section and the bottom of the case and provided with corrugated upper and under surfaces, the under corrugations resting on the bottom of the case and the upper corrugations fitting within the notches in said lower section.

9. An egg filler comprising a plurality of sections placed one upon another, each consisting of plates interlocked with one another to form a series of egg pockets, division members interposed between adjacent sections, each member having means for interlocking with the walls of pockets in abutting sections, and bridging said pockets at the top and bottom thereof to resist lateral and vertical pressure on said sections, said bridging means lapping by the ends of the eggs and forming supports therefor in said pockets.

In witness whereof, I have hereunto set my hand this 12th day of February 1913.

ALLAN C. BUSSEY.

Witnesses:
EDWARD A. PAUL,
GENEVIEVE E. SORENSEN.

Copies of this patent may be obtained for five cents each, by addressing the "Commissioner of Patents, Washington, D. C."